(12) United States Patent
Cho et al.

(10) Patent No.: US 8,977,196 B2
(45) Date of Patent: Mar. 10, 2015

(54) NEAR FIELD COMMUNICATION ANTENNA DEVICE OF MOBILE TERMINAL

(75) Inventors: Kyu Sik Cho, Suwon-si (KR); In Sook Kim, Daegu (KR)

(73) Assignees: Samsung Electronics Co., Ltd., Suwon-si (KR); Globrf Co., Ltd., Seoul (KR)

( * ) Notice: Subject to any disclaimer, the term of this patent is extended or adjusted under 35 U.S.C. 154(b) by 150 days.

(21) Appl. No.: 13/562,834

(22) Filed: Jul. 31, 2012

(65) Prior Publication Data

US 2013/0078917 A1  Mar. 28, 2013

(30) Foreign Application Priority Data

Sep. 28, 2011 (KR) .................. 10-2011-0098082

(51) Int. Cl.
*H04B 5/00* (2006.01)
*H01Q 7/00* (2006.01)
*H01Q 1/24* (2006.01)

(52) U.S. Cl.
CPC . *H01Q 7/00* (2013.01); *H01Q 1/243* (2013.01)
USPC ........................................ 455/41.1; 455/41.2

(58) Field of Classification Search
USPC ............. 455/41.1, 41.2, 556.1; 343/702, 788, 343/700; 345/179
See application file for complete search history.

(56) References Cited

U.S. PATENT DOCUMENTS

| | | | | |
|---|---|---|---|---|
| 2006/0044192 | A1* | 3/2006 | Egbert | 343/700 MS |
| 2008/0149371 | A1* | 6/2008 | Schrooten | 174/254 |
| 2009/0085810 | A1* | 4/2009 | Soler Castany et al. | 343/700 MS |
| 2009/0295760 | A1* | 12/2009 | Linge et al. | 345/179 |
| 2010/0061040 | A1 | 3/2010 | Dabov et al. | |
| 2011/0111793 | A1* | 5/2011 | White | 455/556.1 |
| 2012/0007787 | A1* | 1/2012 | Schantz et al. | 343/788 |

FOREIGN PATENT DOCUMENTS

| | | |
|---|---|---|
| KR | 10-2006-0057962 A | 5/2006 |
| KR | 10-2007-0074714 A | 7/2007 |
| KR | 10-2011-0051277 | 5/2011 |
| KR | 10-2011-0077362 A | 7/2011 |

* cited by examiner

*Primary Examiner* — Wesley Kim
*Assistant Examiner* — Raj Chakraborty
(74) *Attorney, Agent, or Firm* — Jefferson IP Law, LLP

(57) ABSTRACT

A near field communication antenna device of a mobile terminal is provided. The near field communication antenna device includes a window including a display region for transmitting an image displayed by a display and a black mark region formed around the display region, a multi-layer Flexible Printed Circuit Board (FPCB) on which a plurality of layers are laminated on the lower side of the black mark region of the window, and a spiral loop-shaped antenna pattern in which conductive lines are formed on respective layers of the multi-layer FPCB and are connected to each other. Accordingly, a near field communication antenna is not disposed in a separated installation space, an antenna pattern width can be reduced, and performance of the near field communication antenna may be prevented from being degraded when a battery cover is made of metal or has a curved shape.

13 Claims, 19 Drawing Sheets

NEAR FIELD COMMUNICATION ANTENNA DEVICE OF MOBILE TERMINAL

PRIORITY

This application claims the benefit under 35 U.S.C. §119 (a) of a Korean patent application filed on Sep. 28, 2011 in the Korean Intellectual Property Office and assigned Serial No. 10-2011-0098082, the entire disclosure of which is hereby incorporated by reference.

BACKGROUND OF THE INVENTION

1. Field of the Invention

The present invention relates to a near field communication antenna device of a mobile terminal. More particularly, the present invention relates to a near field communication antenna device of a mobile terminal that is without an exclusive space in which a near field communication antenna is installed.

2. Description of the Related Art

Recently, as sharing of data, electronic payment systems, and electronic ticketing systems are increasing, more near field communication antenna devices are installed in mobile terminals. This near field communication antenna device has an LC resonance loop antenna utilizing magnetic coupling to perform near field communications of a range of 10 cm to 20 cm using low frequencies of 13.56 MHz (±7 kHz).

The near filed communication antenna should have an overall area greater than 1,500 $mm^2$ and a length of a minor oval axis longer than 30 mm. A plurality of loops formed by an antenna line of the near field communication antenna needs to be formed in order to generate a desired electromotive force. Since a conductive line forming the plurality of loops is formed in a single layer, a near field communication antenna device of a mobile terminal is limited in reducing a width of antenna patterns for forming the plurality of antenna lines. For reference, a width of the antenna patterns described herein is defined as a value in which a sum of widths of portions without conductive lines (which are gaps between antenna lines) is added to a sum of widths of the conductive lines as measured when viewing the near field communication antenna from top. For example, it is assumed that a width of a single antenna line is 0.8 mm and a gap between conductive lines is 0.4 mm. In this case, if a number of turns of a loop formed by the antenna lines is four, an antenna pattern with a width of 4.8 mm is formed, wherein the width is calculated as (0.8 mm+0.4 mm)*4 loops. However, as mobile terminals are made smaller and thinner, it is difficult to secure an adequate area for a near field communication antenna.

Furthermore, in a case where a near field communication antenna is installed or disposed near to or on a battery or a battery cover of a mobile terminal, performance of the near field communication antenna degrades. In addition, in a case where the battery cover is curved, since the near field communication antenna installed on the battery cover does not have a planar shape, performance of the near field communication antenna degrades due to the shape of the antenna.

SUMMARY OF THE INVENTION

Aspects of the present invention are to address at least the above-mentioned problems and/or disadvantages and to provide at least the advantages described below. Accordingly, an aspect of the present invention is to provide a near field communication antenna of a mobile terminal, which does not need an installation area or space for the near field communication antenna and in which a width of an antenna pattern of the near field communication antenna is reduced.

Another aspect of the present invention is to provide a near field communication antenna of a mobile terminal in which performance of the near field communication antenna is prevented from being degraded when a battery cover is made of a metal or has a curved shape.

In accordance with an aspect of the present invention, a near field communication antenna device of a mobile terminal is provided. The near field communication antenna device includes a window including a display region for transmitting an image displayed by a display and a black mark region formed around the display region, a multi-layer Flexible Printed Circuit Board (FPCB) on which a plurality of layers are laminated on a lower side of the black mark region of the window, and a spiral loop-shaped antenna pattern in which conductive lines are formed on respective layers of the multi-layer FPCB and are connected to each other.

In accordance with another aspect of the present invention, a mobile terminal including a near field communication antenna device, a display, and a window transmitting an image generated by the display are provided. The near field communication device includes a multi-layer FPCB on which a plurality of layers are laminated onto a lower side of the black mark region of the window, and a spiral loop-shaped antenna pattern in which conductive lines are formed on respective layers of the multi-layer FPCB and are connected to each other.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
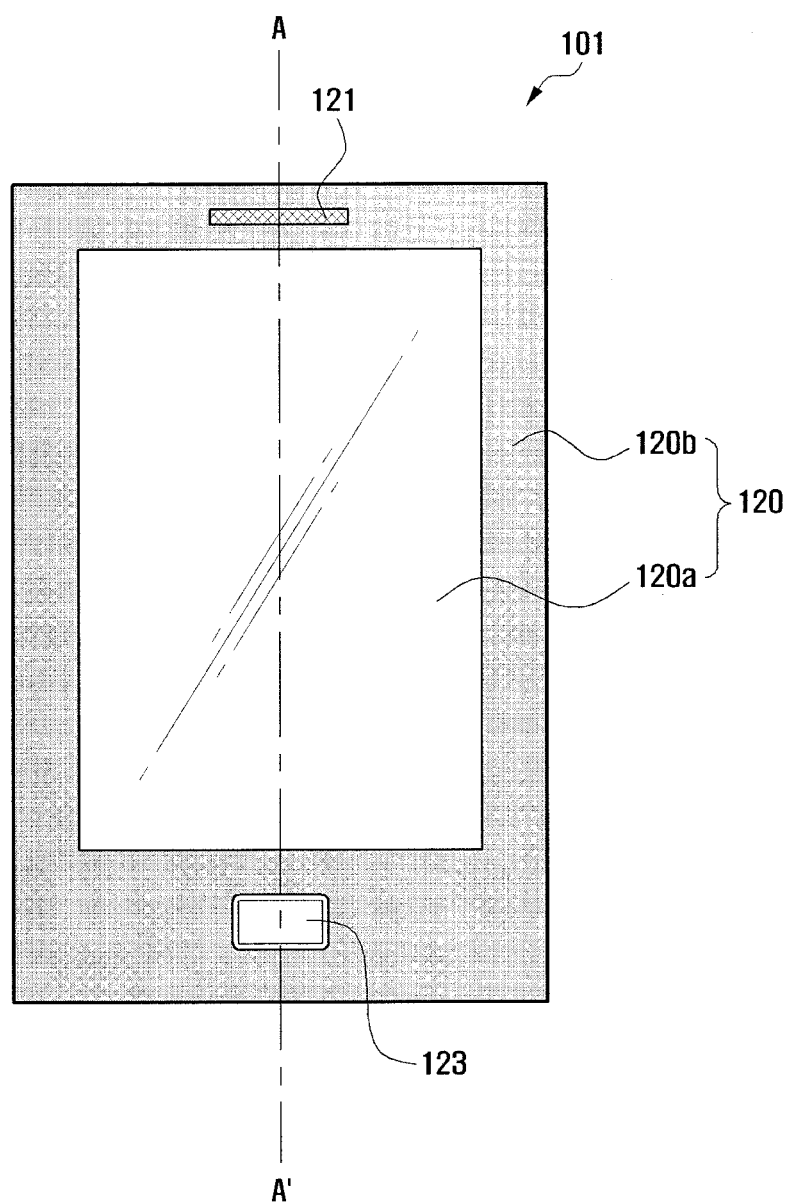
FIG. 1 is a front view of a mobile terminal having a near field communication antenna according to an exemplary embodiment of the present invention.
Figure 2:
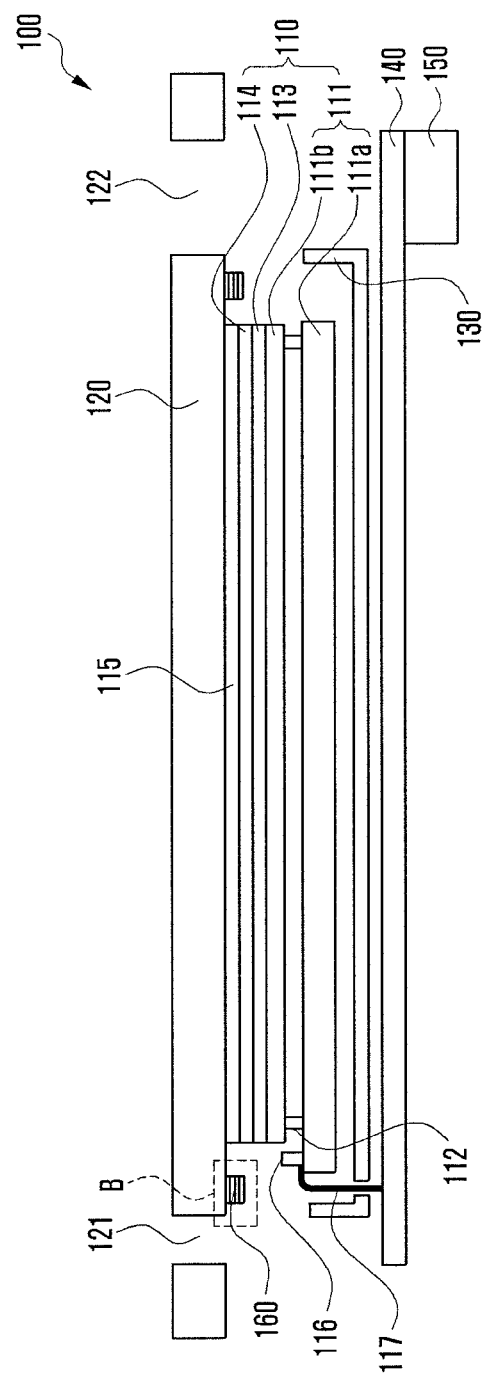
FIG. 2 is a sectional view of the near field communication antenna device of a mobile terminal taken along the cutting line A-A' of the exemplary embodiment of FIG. 1.
Figure 3:
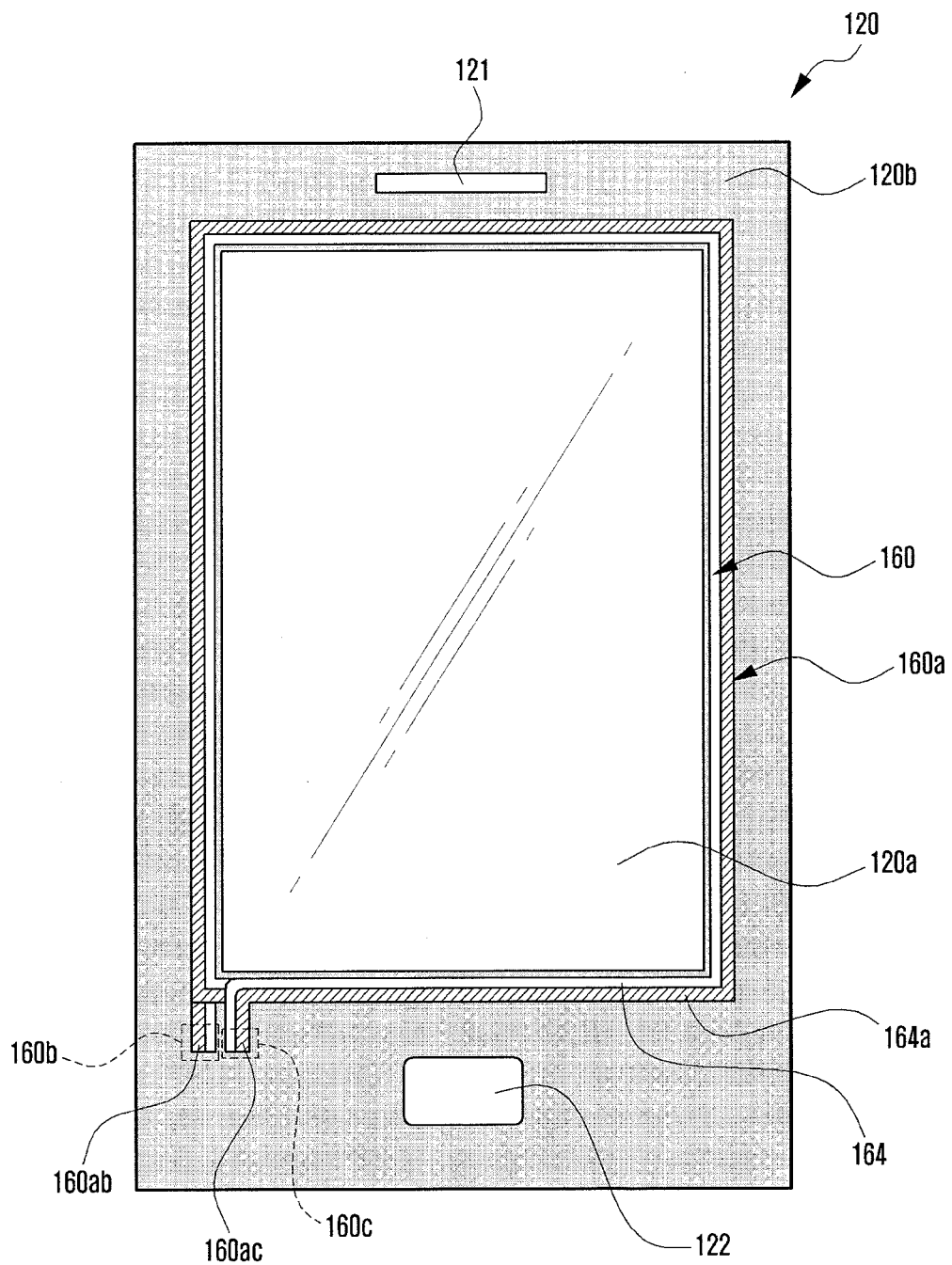
FIG. 3 is a rear view illustrating a window of the exemplary embodiment of FIG. 2.
Figure 4:
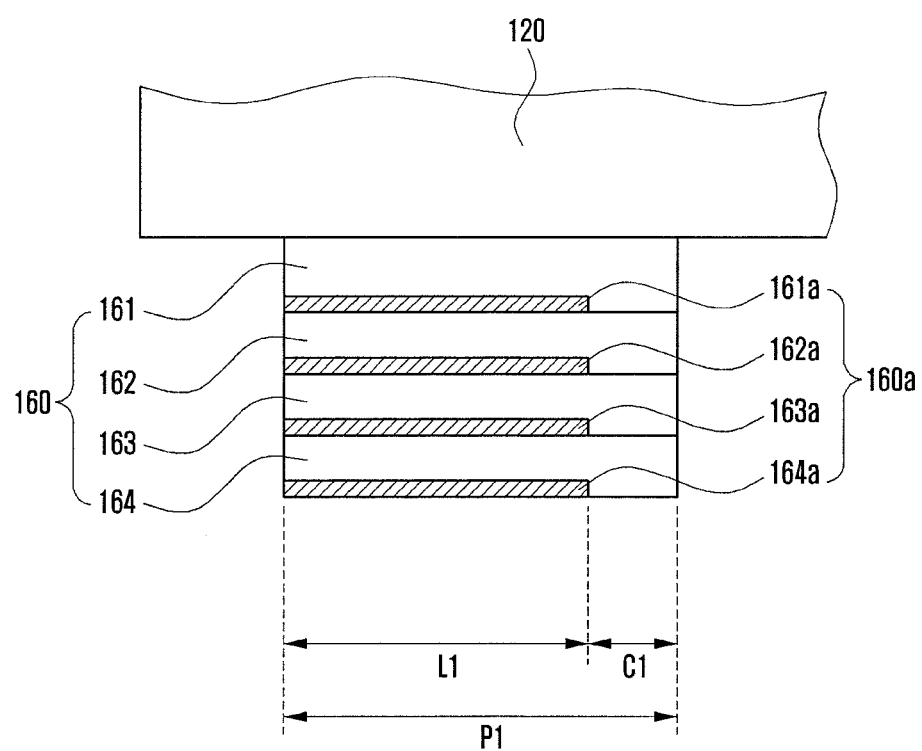
FIG. 4 is an enlarged sectional view of a dotted portion B of the exemplary embodiment of FIG. 2 illustrating a multi-layer Flexible Printed Circuit Board (FPCB)
Figure 5:
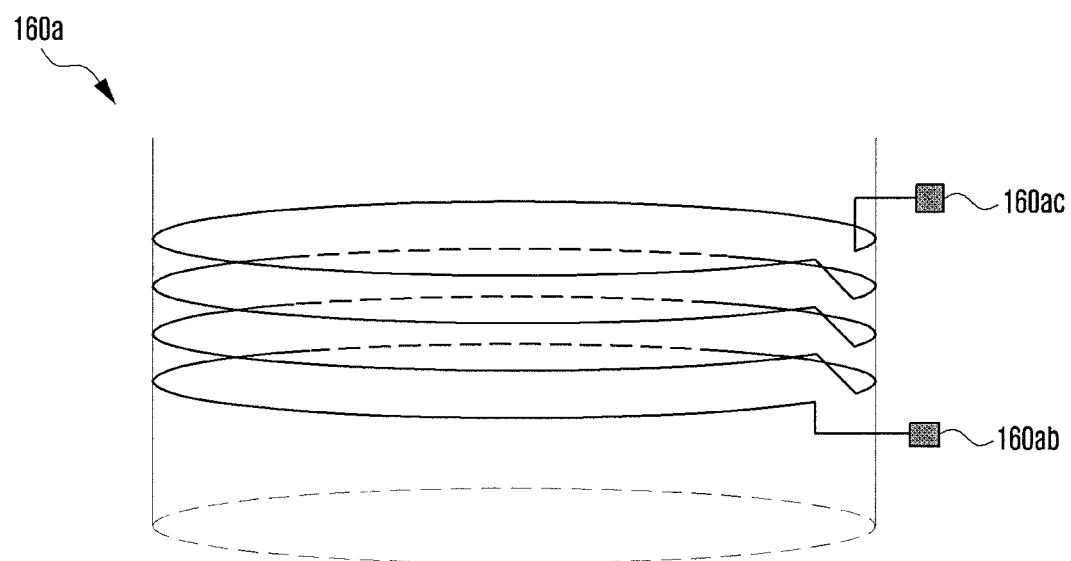
FIG. 5 is a schematic view illustrating an antenna pattern of the multi-layer FPCB of the exemplary embodiment of FIG. 4.

FIG. 1 is a front view of a mobile terminal having a near field communication antenna according to an exemplary embodiment of the present invention. FIG. 2 is a sectional view of the near field communication antenna device of a mobile terminal taken along the cutting line A-A' of the exemplary embodiment of FIG. 1. FIG. 3 is a rear view illustrating a window of the exemplary embodiment of FIG. 2. FIG. 4 is an enlarged sectional view of a dotted portion B of the exemplary embodiment of FIG. 2 illustrating a multi-layer Flexible Printed Circuit Board (FPCB). FIG. 5 is a schematic view illustrating an antenna pattern of the multi-layer FPCB of the exemplary embodiment of FIG. 4.

Referring to FIGS. 1 to 5, a near field communication antenna device 100 of a mobile terminal according to an exemplary embodiment of the present invention will be described as follows. For reference, a cutting line A-A' of FIG. 1 traverses a receiver hole 121 and a key 123 in a longitudinal direction of a mobile terminal 101. A near field communication antenna device 100 of a mobile terminal includes a display 110, a window 120, a multi-layer FPCB 160, and an antenna pattern 160a.

The display 110 displays an image to a user, and according to this exemplary embodiment, is an on-cell Touch Screen Panel (TSP) Active Matrix Organic Light Emitting Diode (AMOLED) display which includes a touch screen sensor pattern 113 formed on an AMOLED 111, and a polarizing plate 114. The AMOLED 111 includes a Low Temperature Polycrystalline Silicon (LTPS) glass 111a made of light emitting organic material so as to emit light and an encapsulating glass 111b sealing the top of the LTPS glass 111a.

A display driver 116 driving the AMOLED 111 is positioned at an upper side of the LTPS glass 111a. The display driver 116 is connected to an FPCB 117 that is connected to a main board 140 so as to transmit a control signal to the display driver 116. A main antenna 150 is mounted on a lower side of the main board 140 and a bracket 130 is disposed between the main board 140 and the display 110. The gap between the lower side of the encapsulating glass 111b and the upper side of the LTPS glass 111a is sealed by a cell seal 112 made of metal glass and the sealed gaps between the encapsulating glass 111b and the LTPS glass 111a is filled with nitrogen gas. The touch screen sensor pattern 113 is formed on the encapsulating glass 111b so as to sense a user touch. The touch screen sensor pattern 113 may be made of Indium Tin Oxide (ITO). The polarizing plate 114 is formed on the touch screen sensor pattern 113 in order to prevent external light from being reflected from the AMOLED 111.

The window 120 transmits an image displayed by the display 110 to a user and protects the display 110 from an external environment, and is disposed on the display 110. The window 120 may be made of glass or any other suitable material. In the present exemplary embodiment, resin 115 is formed between the window 120 and the display 110 so that the external light incident upon the window 120 is prevented from being reflected between the window 120 and the display 110. In other words, the resin 115 is disposed so as to fill in a gap between the window 120 and the display 110.

As illustrated in FIGS. 1 and 3, the window 120 includes a display region 120a transmitting an image displayed by the display 110 and a black mark region 120b formed around the display region 120a. The black mark region 120b blocks visibility of the surroundings of the display 110 of the interior of the mobile terminal 101 and may be formed by attaching a black tape (not shown) or printing or depositing black paint (not shown) on a rear side of the window 120. As illustrated in FIGS. 2 and 3, the window 120 includes the receiver hole 121 and a key hole 122. The receiver hole 121 is connected to a receiver or a speaker (not shown) in order to deliver voice or audio signals generated by the mobile terminal 101. The key 123 is positioned in the key hole 122.

The multi-layer FPCB 160 is an FPCB formed by laminating a plurality of layers on the lower side of the black mark region 120b of the window 120. The multi-layer FPCB 160 may be formed by winding a single FPCB several times in a laminating process or by laminating several FPCBs having separated layers. In the present exemplary embodiment, the multi-layer FPCB 160 is formed on the rear side of the window 120, and the multi-layer FPCB 160 is adjacent to an edge of the display 110 and includes four layers 161, 162, 163, and 164, as seen in FIG. 4.

The antenna pattern 160a is formed as a spiral loop by connecting conductive lines 161a, 162a, 163a, and 164a to respective ones of the layers 161, 162, 163, and 164 of the multi-layer FPCB 160. As illustrated in FIG. 5, the antenna pattern 160a has a plurality of successive loops. The conductive lines 161a, 162a, 163a, and 164a are all formed at the same sides of the respective layers 161, 162, 163, and 164 of the multi-layer FPCB 160 and extend in a longitudinal direction of the multi-layer FPCB 160. In this exemplary embodiment, the conductive lines 161a, 162a, 163a, and 164a overlap with each other when viewed from above. Both ends 160ab and 160ac of the antenna pattern 160a formed at both ends 160b and 160c of the multi-layer FPCB 160 are electrically connected to a near field communication module (not shown). The near field communication module may be mounted on the main board 140.

According to the present exemplary embodiment, an area of the multi-layer FPCB 160 on which the conductive lines 161a, 162a, 163a, and 164a are formed is in the black mark region of the window 120 so that there is no need to prepare an installation area for the near field communication antenna. Moreover, the antenna pattern 160a having the plurality of successive loops may have a reduced antenna pattern width P1 that is less than a width of related-art antenna patterns because the antenna pattern 160a is formed by laminating several layers 161, 162, 163, and 164 on the multi-layer FPCB 160. In more detail, according to the measured results of the present exemplary embodiment, a width L1 of the respective conductive lines 161a, 162a, 163a, and 164a is 0.8 mm on the multi-layer FPCB 160 and a width C1 of the portion on which the conductive lines 161a, 162a, 163a, and 164a are not formed is 0.2 mm. That is, a width P1 of the antenna pattern according to the present exemplary embodiment may be measured to be 1 mm (0.8 mm+0.2 mm), and thus, it is seen that the width is less than the related-art antenna pattern width, which is approximately 4.8 mm.

In addition, according to the present exemplary embodiment, since the multi-layer FPCB 160 having the near field communication antenna is formed on the window 120 that is positioned at the front side of the mobile terminal 101, the near field communication antenna of this exemplary embodiment may radiate and receive near field communication signals from a front of the mobile terminal 101. Thus, even when the battery cover (not shown) of the rear side of the mobile terminal 101 is made of metal, performance of the antenna may be prevented from degrading due to the use of the metal. Furthermore, since the multi-layer FPCB 160 having the near field communication antenna is mounted on the window 120 rather than on the battery cover, various types of battery covers may be applied to or used with the mobile terminal 101.

Figure 6A:
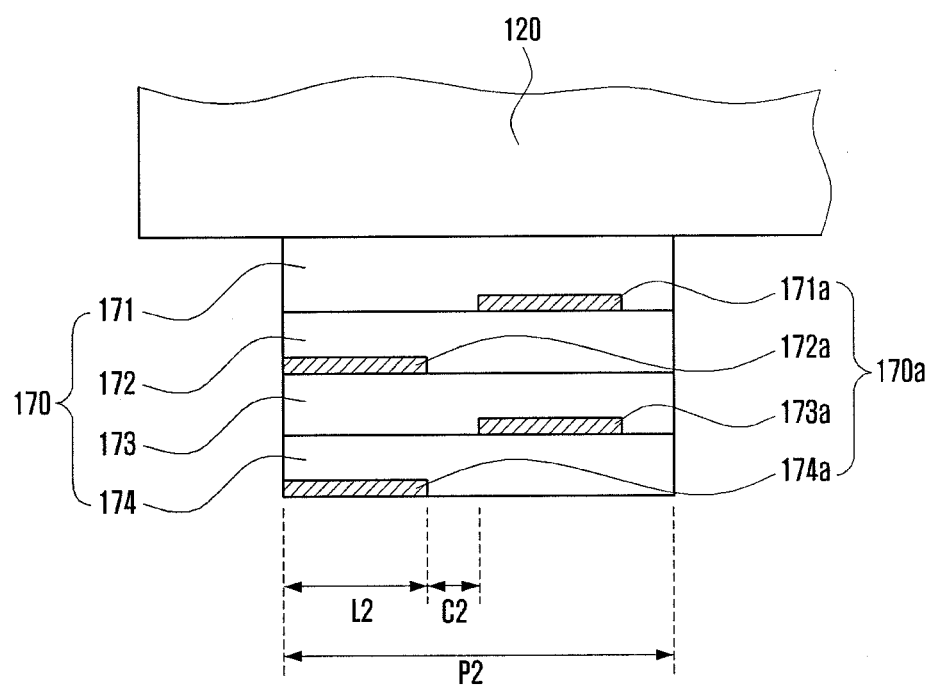
FIG. 6A is a sectional view illustrating a multi-layer FPCB of the multi-layer FPCB of the exemplary embodiment of FIG. 4.
Figure 7:
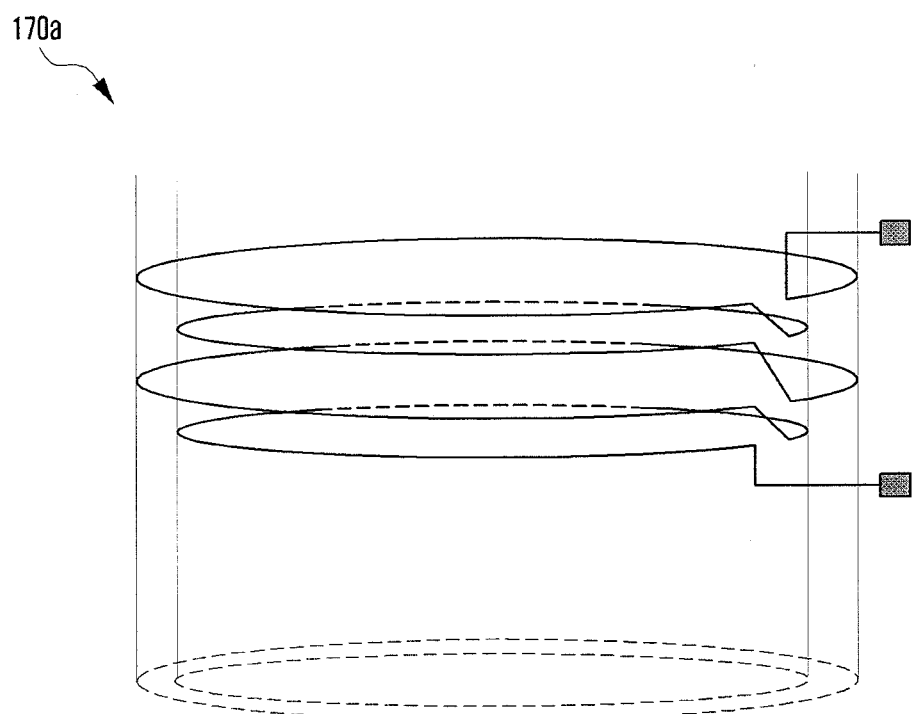
FIG. 7 is a schematic view illustrating an antenna pattern of the multi-layer FPCB of the exemplary embodiment of FIG. 6A.

FIG. 6A is a sectional view illustrating a multi-layer FPCB of the multi-layer FPCB of the exemplary embodiment of FIG. 4. FIG. 7 is a schematic view illustrating an antenna pattern of the multi-layer FPCB of the exemplary embodiment of FIG. 6A. In a multi-layer FPCB 170 of FIG. 6A, differently from the multi-layer FPCB 160 of FIG. 4, conductive lines 171a and 173a, which are respectively formed on a first layer 171 and a third layer 173, are disposed further in from a loop than conductive lines 172a and 174a, which are respectively formed on a second layer 172 and a fourth layer 174. In other words, the conductive lines 171a, 172a, 173a, and 174a respectively formed on the layers 171, 172, 173, and 174 are disposed on alternating sides of the respective layers from an inside to an outside or, alternately on left and right sides. By doing so, the antenna pattern 170a of FIG. 6A, in comparison to the antenna pattern 160a of FIG. 4, has a reduced interference between the conductive lines formed on adjacent layers. Thus, performance of the antenna may be further improved.

In addition, the antenna pattern 170a of FIG. 6A, similar to the antenna pattern 160a of FIG. 4, has an antenna pattern width P2 that is less than that of the related-art antenna pattern because the respective layers 171, 172, 173, and 174 on which the conductive lines 171a, 172a, 173a, and 174a are respectively formed are laminated so as to form the antenna pattern 170a. In more detail, according to the measured results using the present exemplary embodiment, in the multi-layer FPCB 160, a width L2 of each of the respective conductive lines 171a, 172a, 173a, and 174a is 0.8 mm and a width C2 of each of respective portions on which the conductive lines 171a, 172a, 173a, and 174a are not formed may be 0.2 mm. That is, the antenna pattern width P2 of the present exemplary embodiment may be measured to be 2 mm, i.e., (0.8 mm+0.2 mm)*2), such that it can be seen that the width is reduced compared to the related-art antenna pattern width, which is 4.8 mm.

Figure 6B:
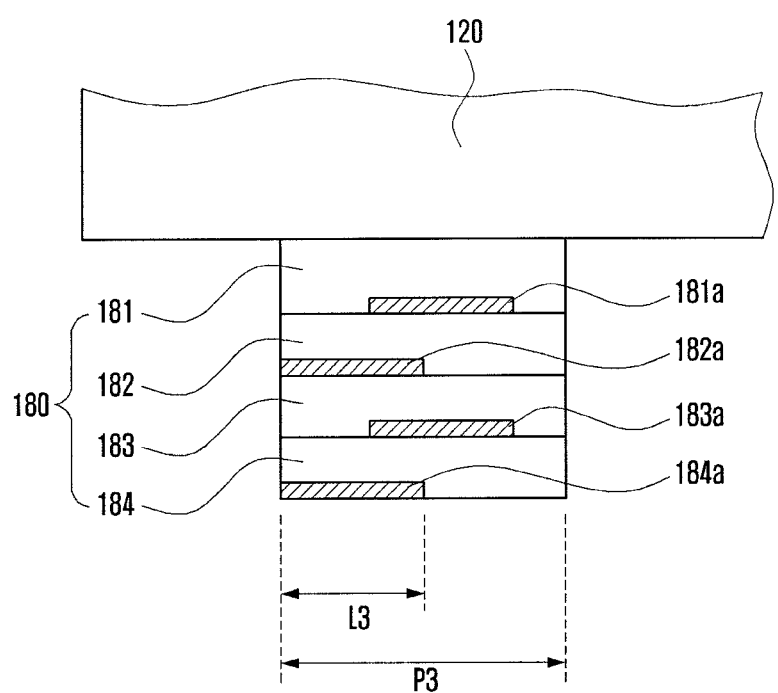
FIG. 6B is a sectional view illustrating a multi-layer FPCB of the multi-layer FPCB of the exemplary embodiment of FIG. 4.

FIG. 6B is a sectional view illustrating a multi-layer FPCB of the multi-layer FPCB of the exemplary embodiment of FIG. 4. A multi-layer FPCB 180 of FIG. 6B, similar to the multi-layer FPCB 170 of FIG. 6A, includes conductive lines 181a, 182a, 183a, and 184a respectively formed on layers 181, 182, 183, and 184 are disposed on alternating sides of the respective layers from an inside to an outside a loop. However, as illustrated in FIG. 6B, the conductive lines 181a, 182a, 183a, and 184a, which are formed on the respective layers 181, 182, 183, and 184, overlap with each other inside the loop when viewed from above. In other words, the conductive lines 181a, 182a, 183a, and 184a are disposed and partially overlapped with each other when viewing the mobile terminal 101 from above.

By doing so, the multi-layer FPCB 180, according to the present exemplary embodiment as illustrated in FIG. 6B, may have an antenna pattern width P3 that is narrower than the antenna pattern width P2 of the multi-layer FPCB 170 of the exemplary embodiment of FIG. 6A even when the antenna pattern width L3 is the same as that of the width L2 of the conductive lines 171a, 172a, 173a, and 174a of the multi-layer FPCB 170. Moreover, the multi-layer FPCB 180, as compared to the multi-layer FPCB 160 as illustrated in FIG. 4, has less interference between the conductive lines formed on the adjacent layers.

Figure 8:
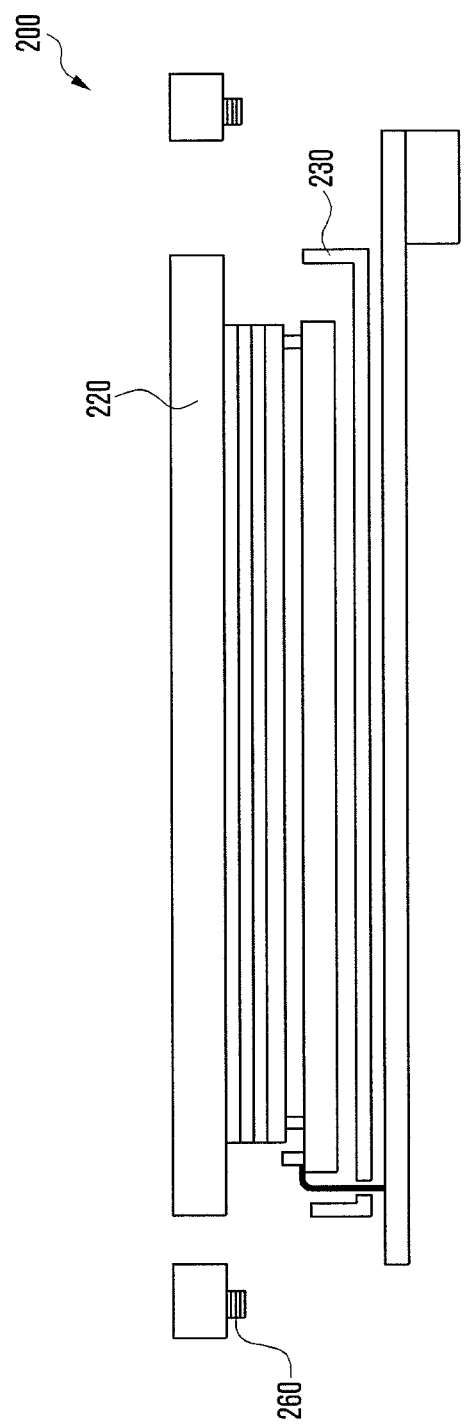
FIG. 8 is a sectional view, taken along the cutting line A-A' of FIG. 1, of a near field communication antenna device according to another exemplary embodiment of the present invention.
Figure 9:
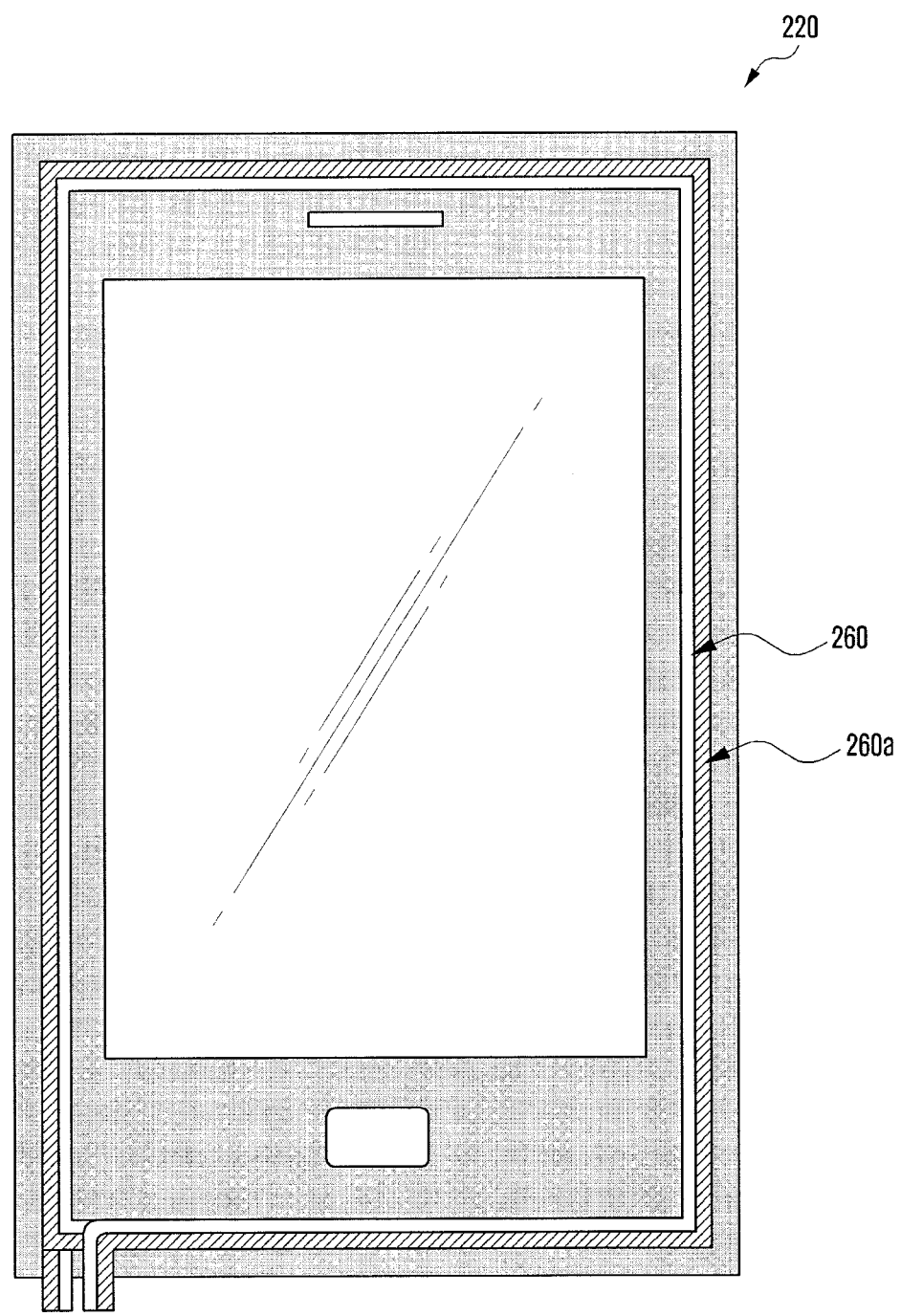
FIG. 9 is a rear view illustrating a window of the exemplary embodiment of FIG. 8.

FIG. 8 is a sectional view, taken along the cutting line A-A' of the exemplary embodiment of FIG. 1, of a near field communication antenna device. FIG. 9 is a rear view illustrating a window of the exemplary embodiment of FIG. 8. A near field communication antenna device 200 of a mobile terminal according to the exemplary embodiments of FIGS. 8 and 9 will be described below.

In the near field communication antenna device 200, according to the present exemplary embodiment is different from the near field communication antenna device 100 of the mobile terminal 101 according to the exemplary embodiments of FIG. 2 and includes a multi-layer FPCB 260 disposed close to an edge of a window 220. That is, in the near field communication antenna device 100 according to the exemplary embodiment of FIG. 2, since the multi-layer FPCB 160 is disposed adjacent to the edge of the display 110, the performance of the antenna is affected by the metal bracket 130.

Particularly, it is hard to guarantee sufficient performance of an antenna when the mobile terminal 101 is in a reader mode. On the other hand, in the near field communication antenna device 200 according to the exemplary embodiment of in FIG. 8, since the multi-layer FPCB 260 is disposed adjacent to an edge of the window 220, a region at which an antenna pattern 260a of the multi-layer FPCB 260 is positioned does not overlap with a region at which a bracket 230 is positioned. Thus, in the present exemplary embodiment, performance of an antenna is not affected by the bracket 230. According to experimental results, the near field communication antenna device 200 of a mobile terminal according to the present exemplary embodiment may produce a recognition range of about 25 mm in the reader mode.

Configuration of the near field communication antenna device 200 of a mobile terminal according to another exemplary embodiment is similar to the configuration of the near field communication antenna device 100 of a mobile terminal according to the previously discussed exemplary embodiments, except for that which was directly above-mentioned.

Figure 10:
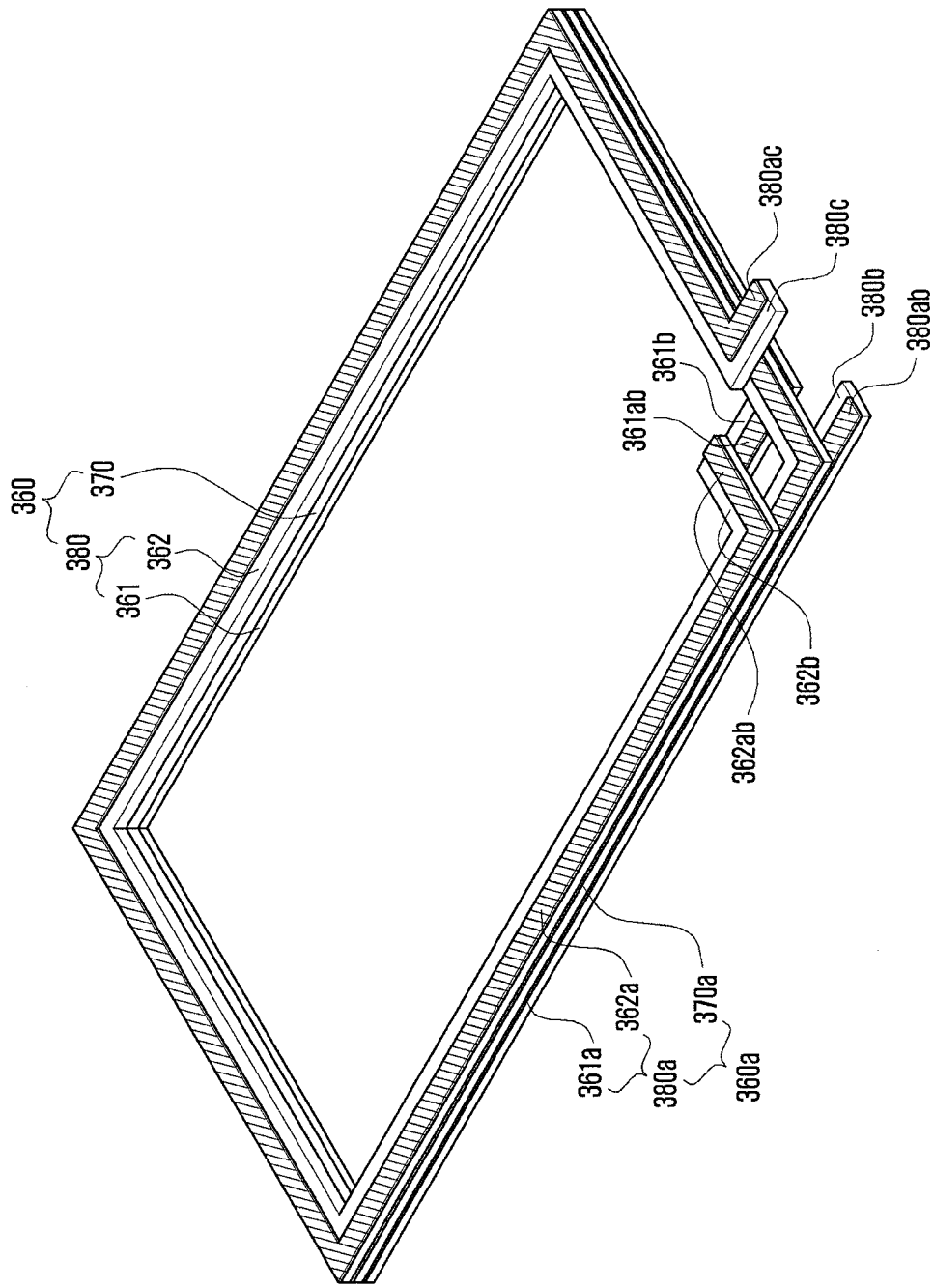
FIG. 10 is a perspective view illustrating a multi-layer FPCB of a near field communication antenna device of a mobile terminal according to still another exemplary embodiment of the present invention.
Figure 11:
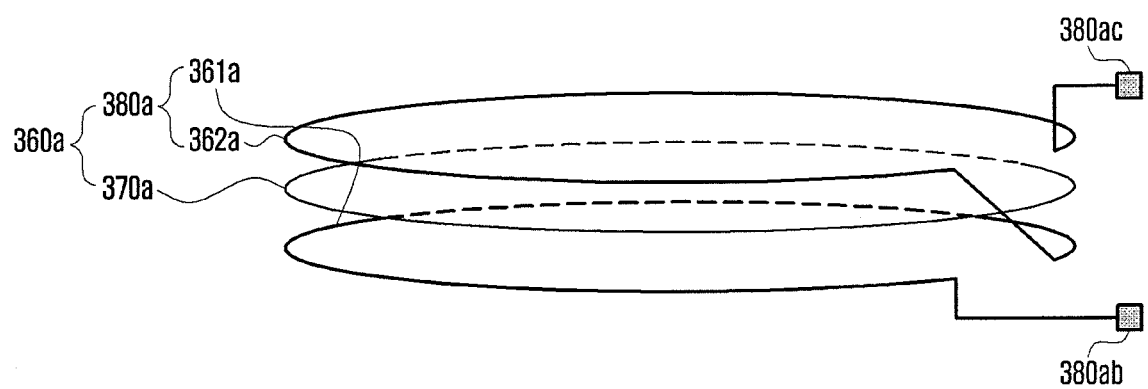
FIG. 11 is a schematic view illustrating an antenna pattern of the multi-layer FPCB of the exemplary embodiment of FIG. 10.

FIG. 10 is a perspective view illustrating a multi-layer FPCB of a near field communication antenna device of a mobile terminal according to another exemplary embodiment of the present invention. FIG. 11 is a schematic view illustrating an antenna pattern of the multi-layer FPCB of the exemplary embodiment of FIG. 10. A multi-layer FPCB 360 of near field communication antenna device of a mobile terminal according to the present exemplary embodiment will be described with reference to FIGS. 10 and 11.

The multi-layer FPCB 360 includes an open loop FPCB 380 and a closed loop FPCB 370. The open loop FPCB 380, similar to the multi-layer FPCB 160 described above, is formed by laminating a plurality of layers 361 and 362 such that conductive lines 361a and 362a formed respectively on layers 361 and 362 are connected to each other so as to form a spiral loop. Moreover, both ends 380ab and 380ac of an open loop antenna pattern 380a, which is formed by the conductive lines 361a and 362a, are connected to each other and are formed at both ends 380b and 380c of the open loop FPCB 380 so as to be electrically connected to a near field communication module (not shown in FIG. 10).

The closed loop FPCB 370 has an antenna pattern 360a that includes a closed loop antenna pattern 370a that is electrically separated from the open loop antenna pattern 380a. In the present exemplary embodiment, the closed loop FPCB 370 is laminated so as to be disposed between two layers, the first layer 361 and the second layer 362 that form the open loop FPCB 380. By doing so, respective ends 361b and 362b of a first layer 361 and a second layer 262 protrude inwards from the loop such that respective ends 361ab and 362ab of conductive lines 361a and 362a are electrically connected to each other. This structure in which the ends 361ab and 362ab of the conductive lines 361a and 362a are electrically connected to each other may be made by forming a through-hole filled with conductive material at a lower side of the end 362b of the conductive line 362a of the second layer 362, and soldering the conductive material, and other similar methods. The near field communication antenna device of a mobile terminal according to the present exemplary embodiment is similar to the near field communication antenna device of a mobile terminal according to the previously described exemplary embodiments, except for that which is directly mentioned in the exemplary embodiment of FIGS. 10 and 11.

The near field communication antenna device according to the present exemplary embodiments may provide better performance in accordance with the number of turns of the antenna pattern of the multi-layer FPCB. However, an allowable frequency of operation of the near field communication antenna may be fixed to 13.56 MHz, and an antenna pattern length longer than a length of an antenna pattern corresponding to 13.56 MHz should not be used.

Since the antenna pattern according to the present exemplary embodiment of FIG. 11 includes the closed loop antenna pattern 370a in addition to the open loop antenna pattern 380a, in order to provide increased performance of an antenna without a longer open loop antenna pattern 380a used for achieving a pre-determined resonance frequency of an antenna. This increased performance of an antenna may be achieved by a physical process in which an induced current flows through the closed loop antenna pattern 370a due to a magnetic field generated by a current flowing through the open loop antenna pattern 380a, wherein the magnetic field is reinforced by the induced current.

Figure 12:
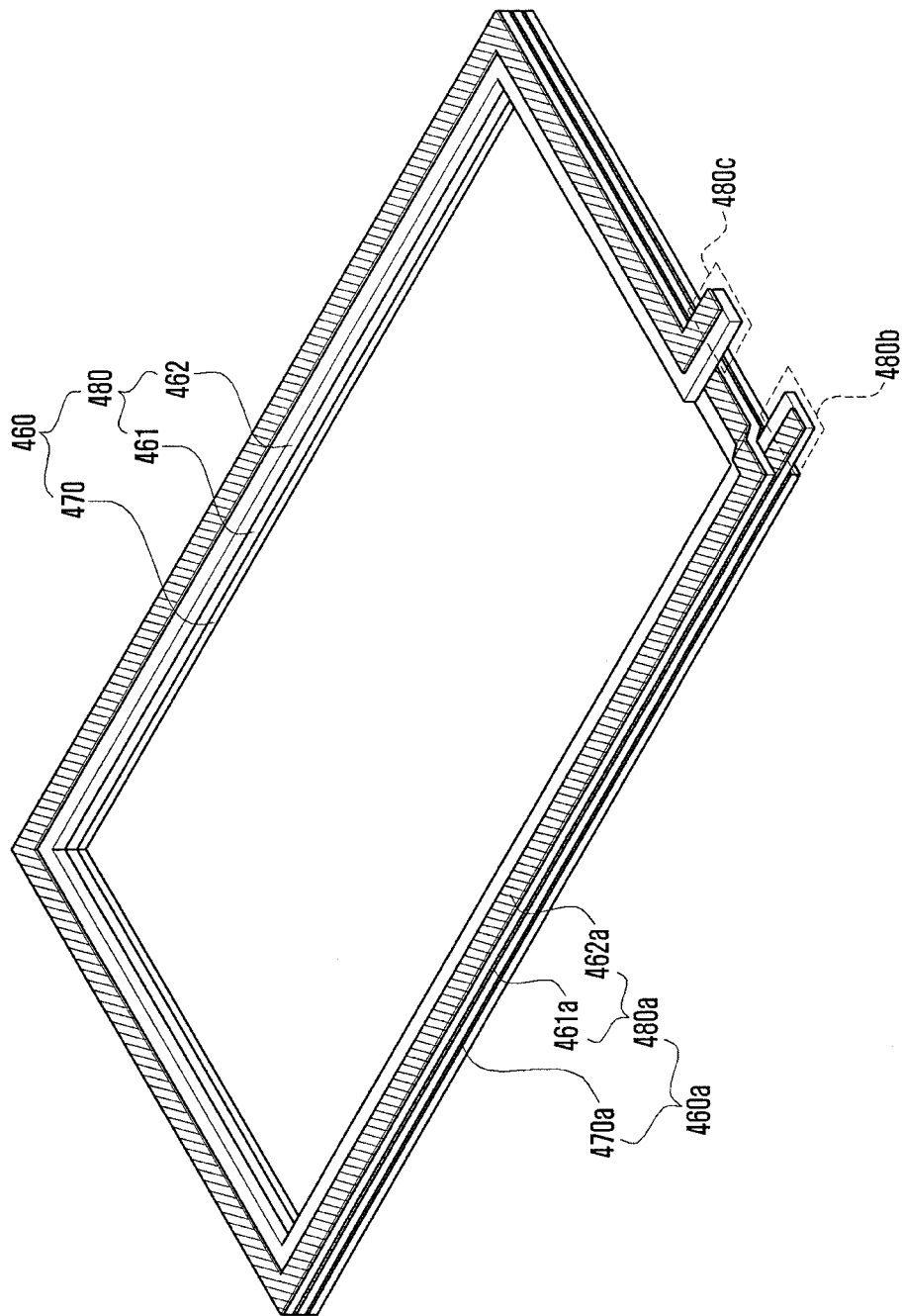
FIG. 12 is a perspective view illustrating a multi-layer FPCB of the exemplary embodiment of FIG. 10.
Figure 13:
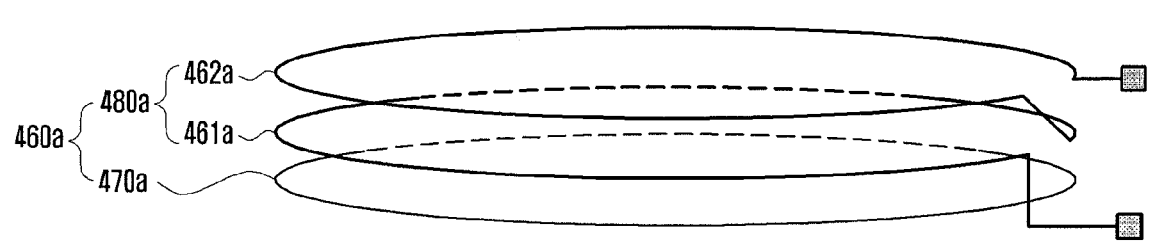
FIG. 13 is a schematic view illustrating an antenna pattern of a multi-layer FPCB of the exemplary embodiment of FIG. 12.
Figure 14:
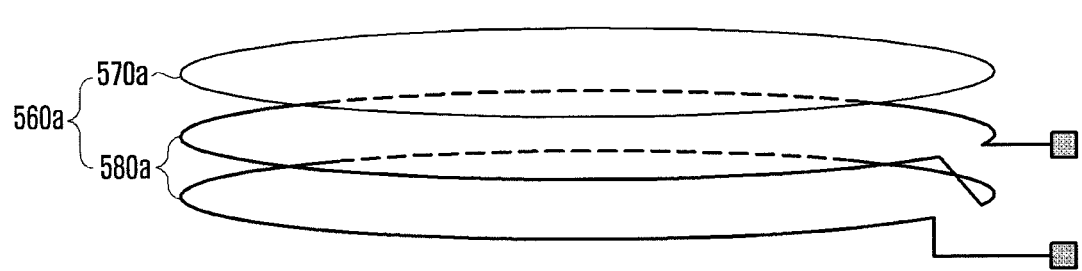
FIG. 14 is a schematic view illustrating an antenna pattern of the multi-layer FPCB of the exemplary embodiment of FIG. 10.

FIG. 12 is a perspective view illustrating a multi-layer FPCB of the exemplary embodiment of FIG. 10. FIG. 13 is a schematic view illustrating an antenna pattern of the multi-layer FPCB of the exemplary embodiment of FIG. 12. FIG. 14 is a schematic view illustrating an antenna pattern of the multi-layer FPCB of the exemplary embodiment of FIG. 10. A multi-layer FPCB 460 according to the present exemplary embodiment of the multi-layer FPCB as illustrated in FIG. 10 will be described with reference to FIGS. 12 to 14.

The multi-layer FPCB 460 is similar to the multi-layer FPCB 360 as illustrated in FIG. 10, and includes an open loop FPCB 480 and a closed loop FPCB 470. The open loop FPCB 480 is made by laminating a plurality of layers 461 and 462 and has a spiral loop in which conductive lines 461a and 462a are formed on respective layers 461 and 462 that are connected to each other. Both ends 480b and 480c of the open loop antenna pattern 480a are formed by connecting the conductive lines 461a and 462a at both ends 480b and 480c so as to be electrically connected to a near field communication module (not shown).

The closed loop FPCB 470 of the present exemplary embodiment has the closed loop antenna pattern 470a electrically disconnected from the open loop antenna pattern 480a. The closed loop FPCB 470, unlike the closed loop FPCB 370 as illustrated in FIG. 10, is laminated so as to be on a lower side of the open loop FPCB 480. Moreover, as is similar to an antenna pattern 560a according to an exemplary embodiment illustrated in FIG. 14, the closed loop FPCB may be laminated on the open loop FPCB such that a closed loop antenna pattern 570a is disposed on the open loop antenna pattern 580a.

Figure 15:
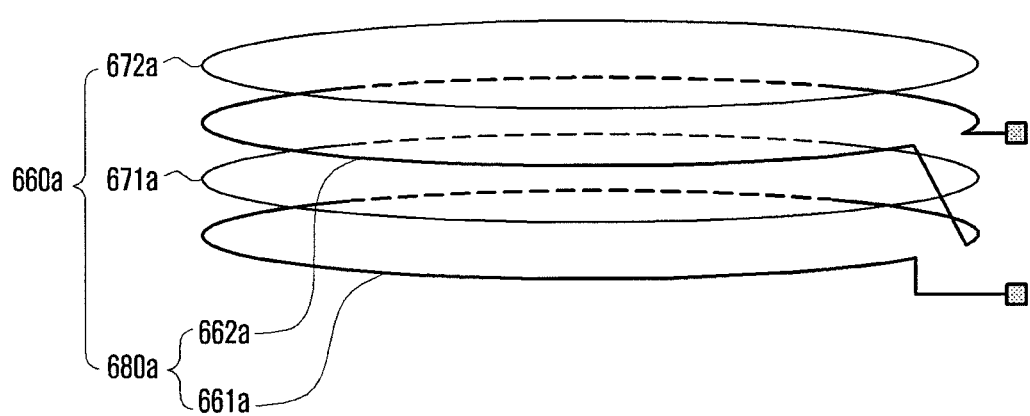
FIG. 15 is a schematic view illustrating an antenna pattern of the multi-layer FPCB of the exemplary embodiment of FIG. 10.
Figure 16:
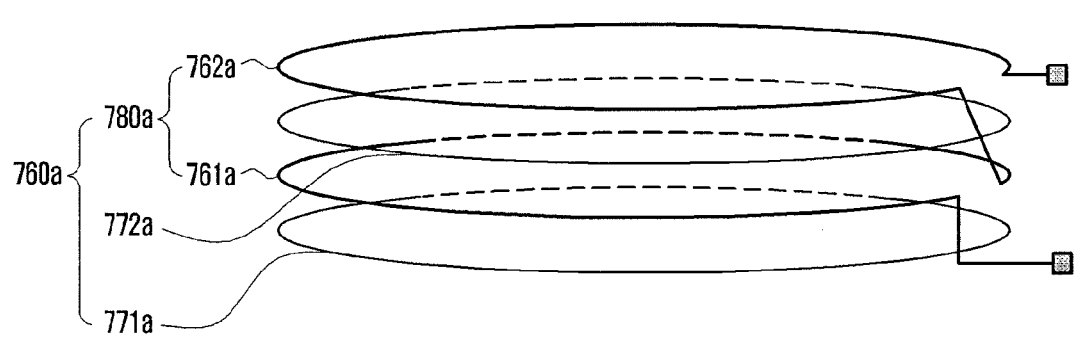
FIG. 16 is a schematic view illustrating an antenna pattern of the multi-layer FPCB of the exemplary embodiment of FIG. 10.
Figure 17:
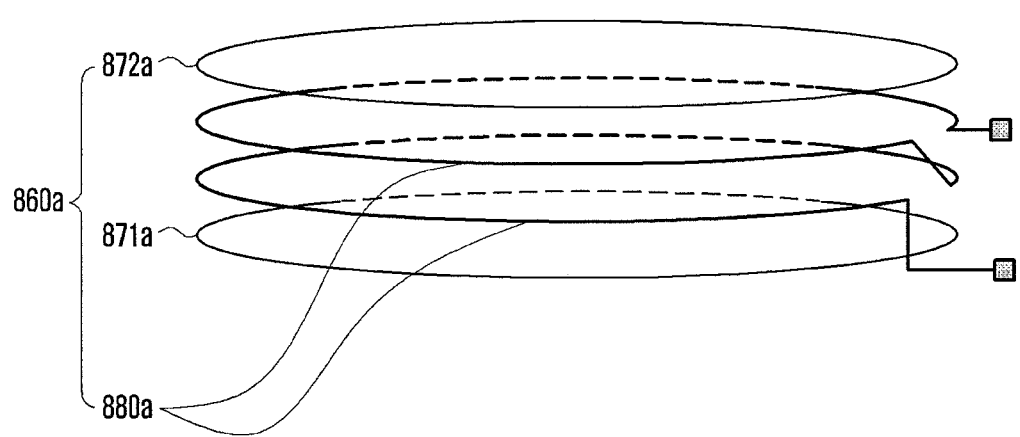
FIG. 17 is a schematic view illustrating an antenna pattern of the multi-layer FPCB of the exemplary embodiment of FIG. 10.
Figure 18:
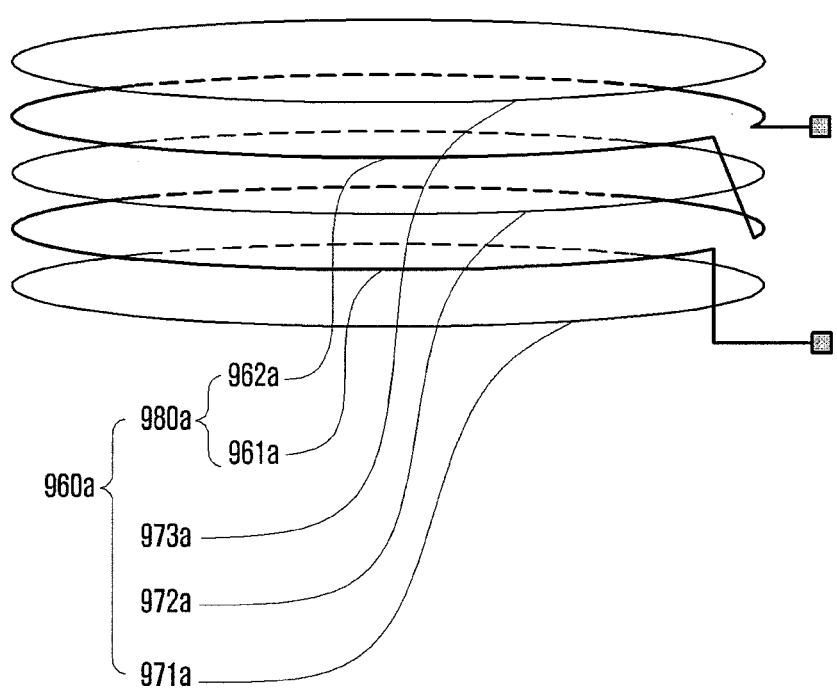
FIG. 18 is a schematic view illustrating an antenna pattern of the multi-layer FPCB of the exemplary embodiment of FIG. 10.

FIG. 15 is a schematic view illustrating an antenna pattern of a multi-layer FPCB of the exemplary embodiment of FIG. 10. FIG. 16 is a schematic view illustrating an antenna pattern of the multi-layer FPCB of the exemplary embodiment of FIG. 10. FIG. 17 is a schematic view illustrating an antenna pattern of the multi-layer FPCB of the exemplary embodiment of FIG. 10. FIG. 18 is a schematic view illustrating an antenna pattern of the multi-layer FPCB of the exemplary embodiment of FIG. 10.

Antenna patterns 660a, 760a, 860a, and 960a, according to respective exemplary embodiments as illustrated in FIGS. 15 to 18, respectively include a plurality of closed loop antenna patterns 671a, 672a, 771a, 772a, 871a, 872a, 971a, 972a, and 973a.

Specifically, a multi-layer FPCB (not shown) according to the exemplary embodiment illustrated in FIG. 15, includes a first closed loop FPCB (not shown) on which a first closed loop antenna pattern 671*a* is formed so as to be laminated between the two layers forming an open loop FPCB (not shown) and a second closed loop FPCB (not shown) on which a second closed loop antenna pattern 672*a* is formed so as to be laminated on the open loop FPCB, such that the first closed loop antenna pattern 671*a* is disposed between conductive lines 661*a* and 662*a*, which form an open loop antenna pattern 680*a*, and so that a second closed loop antenna pattern 672*a* is disposed on the open loop antenna pattern 680*a*.

A multi-layer FPCB (not shown) according to the exemplary embodiment of FIG. 16, includes a first closed loop FPCB (not shown) on which a first closed loop antenna pattern 771*a* is formed so as to be laminated on the lower side of the open loop FPCB (not shown) and a second closed loop FPCB (not shown) on which a second closed loop antenna pattern 772*a* is formed so as to be laminated between two layers forming the open loop FPCB. As such, the first closed loop antenna pattern 771*a* is disposed at the lower side of the opening loop antenna pattern 780*a* and a second closed loop antenna pattern 772*a* is disposed between conductive lines 761*a* and 762*a*, thus forming an open loop antenna pattern 780*a*.

A multi-layer FPCB (not shown) according to the exemplary embodiment of FIG. 17, includes a first closed loop FPCB (not shown), on which the first closed loop antenna pattern 871*a* is formed, and a second closed loop FPCB (not shown), on which a second closed loop antenna pattern 872*a* is formed. The antenna patterns 871*a* and 872*a* are laminated on the lower and upper sides of the open loop FPCB (not shown), such that the first closed loop antenna pattern 871*a* is disposed at the lower side of an open loop antenna pattern 880*a* and a second closed loop antenna pattern 872*a* is disposed on an upper side of the open loop antenna pattern 880*a*.

A multi-layer FPCB (not shown) according to the exemplary embodiment of FIG. 18, includes first and third closed loop FPCBs (not shown), on which first and third closed loop antenna patterns 971*a* and 973*a* are formed, and are laminated on the lower and upper sides of an open loop FPCB (not shown). A second closed loop FPCB (not shown), on which a second closed loop antenna pattern 972*a* is formed, is laminated so as to be between two layers forming the open loop FPCB, such that the first and third closed loop antenna patterns 971*a* and 973*a* are disposed at the lower and upper sides of an open loop antenna pattern 980*a* and such that the second closed loop antenna pattern 972*a* is laminated between conductive lines 961*a* and 962*a*, which form the open loop antenna pattern 980*a*.

The multi-layer FPCBs according to the exemplary embodiments of FIGS. 15-18 include a plurality of closed loop FPCBs on which closed loop antenna patterns are formed, and thus may generate a stronger magnetic field than the multi-layer FPCBs including only one closed loop, such as the FPCBs 370 and 470 as illustrated in FIGS. 10 and 12.

The conductive lines of the open loop antenna patterns forming the antenna patterns 360*a*, 460*a*, 560*a*, 660*a*, 760*a*, 860*a*, and 960*a* and the closed loop antenna patterns as illustrated in FIGS. 10 to 18 may be respectively disposed on alternating sides of the respective layers from an inside to an outside of the loop.

According to the exemplary embodiments of the present invention, since a multi-layer FPCB, which has a spiral loop-shaped antenna pattern formed by connecting the conductive lines of the antenna pattern formed in respective layers of the multi-layer FPCB to each other, forms a black mark region of a window of a mobile terminal, an additional installation area is not needed for the near field communication antenna.

Moreover, since the conductive lines of multiple successive loops are laminated on the multi-layer FPCB, a width of the antenna pattern may be reduced.

In addition, since the multi-layer FPCB implementing the near field communication antenna is formed on a window, performance of the near field communication antenna may be prevented from being degraded when the battery cover is made of a metal or has a curved shape.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A near field communication antenna device of a mobile terminal, the device comprising:
    a window including a display region for transmitting an image displayed by a display and a black mark region formed around the display region;
    a multi-layer Flexible Printed Circuit Board (FPCB) on which a plurality of layers are laminated, the multi-layer FPCB being disposed on a lower side of the black mark region of the window;
    a spiral loop-shaped antenna pattern in which conductive lines are formed on respective layers of the multi-layer FPCB and are connected to each other; and
    a closed loop FPCB having a closed loop antenna pattern that is electrically disconnected from the antenna pattern, the closed loop FPCB being laminated so as to be at least one of (i) between at least two layers of the plurality of layers of the multi-layer FPCB, (ii) on an upper side of the multi-layer FPCB, and (iii) on a lower side of the multi-layer FPCB.

2. The device of claim 1, wherein the conductive lines are disposed on the respective layers of the multi-layer FPCB on alternating sides of the respective layers from inside of the loop.

3. The device of claim 1, wherein the multi-layer FPCB is disposed so as to be adjacent to an edge of the window.

4. The device of claim 1, wherein the display comprises an Active Matrix Organic Light Emitting Diode (AMOLED) display.

5. The device of claim 4, wherein the display comprises a touch screen sensor pattern formed on an upper side of the AMOLED display.

6. The device of claim 1, wherein both ends of the antenna pattern are electrically connected to a near field communication module.

7. A mobile terminal including a near field communication antenna device, a display, and a window transmitting an image generated by the display, the mobile terminal comprising:
    a multi-layer Flexible Printed Circuit Board (FPCB) on which a plurality of layers are laminated, the multi-layer FPCB being disposed onto a lower side of a black mark region of the window;
    a spiral loop-shaped antenna pattern in which conductive lines are formed on respective layers of the multi-layer FPCB and are connected to each other; and
    a closed loop FPCB having a closed loop antenna pattern that is electrically disconnected from the antenna pattern, the closed loop FPCB being laminated so as to be at least one of (i) between at least two layers of the plurality of layers of the multi-layer FPCB, (ii) on an upper side of the multi-layer FPCB, and (iii) on a lower side of the multi-layer FPCB.

8. The mobile terminal of claim 7, wherein the conductive lines are disposed on the respective layers of the multi-layer FPCB on alternating sides of the respective layers so as to not overlap when viewed from a vertical direction extending from the multi-layer FPCB through the window.

9. The mobile terminal of claim 7, wherein the near field communication device further comprises a closed-loop antenna pattern formed in the shape of a circle.

10. The mobile terminal of claim 9, wherein the closed-loop antenna pattern is disposed so as to be at least one of on top of the spiral loop-shaped antenna pattern, below the spiral loop-shaped antenna pattern, and between at least two loops of the spiral loop-shaped antenna pattern.

11. The mobile terminal of claim 7, wherein the multi-layer FPCB is disposed so as to be adjacent to an edge of the window.

12. The mobile terminal of claim 7, wherein both ends of the antenna pattern are electrically connected to a near field communication module.

13. The mobile terminal of claim 7, wherein the conductive lines are formed of one continuous wire line.

* * * * *